F. S. CARR.
FASTENER.
APPLICATION FILED OCT. 22, 1920.

1,376,002. Patented Apr. 26, 1921.

Inventor:
Fred S. Carr,
by Emery Booth Janney + Varney
Attys.

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

1,376,002.  Specification of Letters Patent.  Patented Apr. 26, 1921.

Original application filed July 14, 1919, Serial No. 310,592. Divided and this application filed October 22, 1920. Serial No. 418,681.

*To all whom it may concern:*

Be it known that I, FRED S. CARR, a citizen of the United States, and a resident of Newton, in the county of Middlesex and State of Massachusetts, have invented an Improvement in Fasteners, of which the following description, in connection with the accompanying drawings, is a specification, like characters on the drawings representing like parts.

This invention relates to stud and socket fasteners and the object is to provide an improved fastener of this type adaptable, although not necessarily limited, to the heavier sort of work such as the fastening of automobile curtains. In the particular embodiment of this invention herein disclosed the fastener is of the type wherein the resiliency resides in the stud and provision is furthermore made whereby the fastener will open from but one side. In other words, the fastener is of the three-side lock type.

This application is a division of my application Serial No. 310,592, filed July 14th, 1919, and allowed September 29th, 1920.

My invention will best be understood by reference to the following description taken in connection with the illustrative embodiment thereof shown in the accompanying drawings wherein:—

Figure 1:
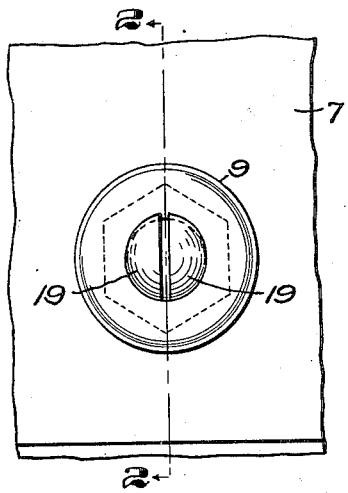
Figure 1 is a front elevation of a fastener embodying my invention.

Referring to the drawings and particularly to the form shown in Fig. 1, I have there shown my invention as applied to a fastener having the male member secured to a fixed support 5, for example the body or frame of an automobile, and the female member or socket secured to a member which may be readily flexible, such as the curtain 7 of an automobile, and which is to be fastened to the support 5. The socket member which is secured to the curtain 7 is of ring-like form and may be a simple eyelet or gromet 9, preferably circular as shown in Fig. 1.

The stud which coöperates with the gromet 9 may conveniently be formed integrally from a single piece of resilient sheet metal as herein shown, the stud comprising a hollow body having a base portion 11 turned over the head of a screw 13 by which it may be secured to the support 5. Obviously, however, the particular manner in which the stud is secured in position is not of the essence of the invention which is more particularly concerned with the construction of the stud itself. In the example shown the stud comprises a hollow, substantially cylindrical shank 15 which may, as in the present instance, be cylindrical in the narrower sense of a right circular cylinder. The stud is terminally offset in the direction of strain (upwardly in the figures) to form a head providing an abrupt shoulder 17 from which the end of the stud leads in a smooth curve, without projections or shoulders, across the end and to the base portion 11 as clearly shown in Fig. 2. The metal forming the head of the stud may also conveniently be pressed slightly outwardly at the sides, as indicated at 19, to form rounded lateral shoulders. To provide resiliency in the stud, the latter may be provided with a slit 21 extending from the point of the shoulder 17 across the end of the stud and along the lower side thereof to the base 11. A stud constructed in this way has at its upper side a rigid hook-like portion having a straight base 16 parallel to the axis of the stud and a point provided by the abrupt shoulder 17. The straight bottom portion of this hook constitutes a spring hinge about which the lateral portions of the stud may yield laterally, that is, in a substantially horizontal direction viewing Fig. 1. It will be understood that if the stud at the rear of the shoulder 17 were not straight in this manner, this yielding action could not be obtained. At the same time the stud is substantially rigid vertically, the two opposed portions thereof taking the strain in that direction being generally channel-shaped. The portion of the stud directly opposite the straight-bottom portion 16 is preferably, as best shown in Fig. 2, substantially parallel with the straight-bottom portion 16.

Figure 2:
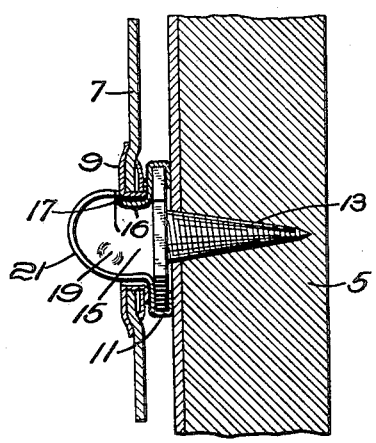
Fig. 2 is a section on the line 2—2 of Fig. 1.

Referring to Fig. 2, it will be understood that the stud is assembled on the work with the shoulder portion projecting in the direction of the strain which comes on the curtain or other device 7; and the parts of the fastener are assembled by presenting the eyelet 9 in a somewhat angular position to the stud, hooking the upper portion over behind the shoulder 17 and then swinging it downwardly to the position shown in Fig. 2. The smooth, unshouldered lower surface of the stud permits this action with an eyelet or socket having a diameter substantially that of the shank of the stud. Thus, the eyelet or socket when in position is closely adapted to and fits the shank of the stud and may be held thereon by the lateral resiliency thereof. When, as is preferred, the shoulders 19 are used the eyelet will pass over these shoulders with a snap, their rounded nature permitting the eyelet to displace inwardly the laterally yieldable wing portions of the stud and reach to the position shown in Fig. 2.

The curtain 7 may be released by a reversal of the process of assembly consisting of a tipping pull on the lower edge in Fig. 2; but the stud is positively locked against opening from any other side because of the engagement of the eyelet behind the abrupt shoulder 17.

The eyelet cannot ride over the shoulder because the latter is thus abrupt and because the diameter of the socket is less than the distance from the point of the shoulder to the opposite side of the stud and the resiliency in the stud is in the lateral direction only (horizontal in the figures), the stud being substantially rigid in a vertical direction so that no amount of pull can cause a yielding which would release the eyelet from the shoulder. The usual strain on such a fastener in practice is one exerted on the curtain upwardly viewing Fig. 2. If this strain is to the right, obviously the eyelet 9 seats on the dead metal of the base 11 and there is no tendency for the parts to separate. If it is to the left, the eyelet is supported by the rigid hook and similarly assumes an angular position and jams across the rigid dimension of the stud; and under certain circumstances the eyelet will also seat at its lower end against the base 11. The strain in no instance tends to act on the resilient portions of the fastener in such a way as to compress the stud in a manner which might release the eyelet or socket 9.

Figure 3:
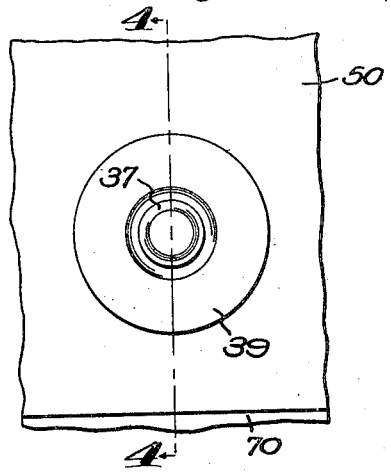
Fig. 3 is a front elevation of the fastener applied somewhat differently.
Figure 4:
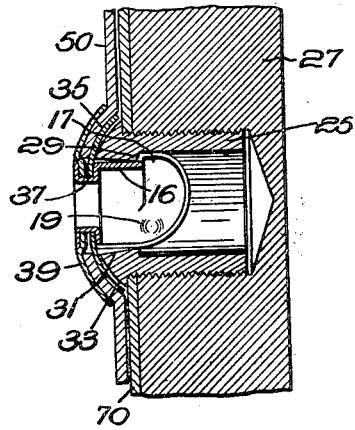
Fig. 4 is a section on the line 4—4 of Fig. 3.

In Figs. 3 and 4, I have shown a fastener formed with a similar stud but wherein the male portion or stud is fastened to a flexible member for attachment to a socket on another flexible member or, as herein shown, on a rigid support.

Referring to Fig. 4, it will be seen that an upward pull on the curtain 50 carrying the stud tends to rock the same about the shouldered portion 17 as a fulcrum and to release the stud in the same way as a lifting tip of the lower portion of the support 70 would do. In other words, the strain on the upper side of the stud-carrying member is equivalent to a lifting and tipping action on the lower side of the socket-carrying member in the arrangement shown in Fig. 1 and Fig. 2. To prevent this release, while at the same time permitting the stud to be rocked out of engagement with the socket by a pull on the lower portion of the curtain 50, I may adopt the construction shown in Figs. 3 and 4 which is particularly designed for use with automobiles, the socket being secured to the body and the stud to the flexible curtain.

In the construction shown, I may utilize a suitable form of socket of which the preferred embodiment here shown takes the form of a bushing 25 exteriorly threaded and adapted to be screwed into the usual wooden backing 27 of an automobile frame. The bushing is provided with an interior shoulder 29 behind which the head of the stud is adapted to lock; and the opening by which the stud is introduced to this shoulder is preferably flared outwardly therefrom as shown at 31. The bushing may also be provided with the domed or convex front 33, conveniently in the form of a flange to overlie the face of the support.

The stud herein shown rises from a concave base 35 adapted to be secured to the curtain or other flexible material marginally, that is, so that the margin of the base lies substantially in the normal plane of the fabric, this being effected in the present instance by the rivet or eyelet 37 secured to the base 35 and the dished washer 39 which coöperates with the base 35 to clamp the curtain between them. The stud is thus, as it were, countersunk in the supporting fabric 50 and thereby the shoulder 17 may be brought nearer to the normal plane of the fabric than the length of the stud. There is thus provided around the stud a recess which may receive, when the parts are assembled, any projecting portion of the socket such as that provided by the convex margin 33, the margin herein substantially fitting the concave recess provided by the base 35. The margin of the socket is presented adjacent the support either to bear thereagainst or to seat thereon under slight strain and find a bearing thereon, thus providing a stop to check or limit the rocking movement which might release the stud. It will be understood, of course, that in speaking of the margin bearing on the support I do not necessarily mean direct contact, as obviously an extension of the socket member proper might make contact with the base 35 and yet the rigid resistance of the support be utilized.

Such a construction as I have described prevents an accidental separation of the parts. First, the line of strain is brought closer to the point where the shoulder 17 interlocks with the shoulder 29 and the turning moment tending to rock the stud out of position is diminished. If the stud starts to tip, the concave mounting thereof coöperates with the rigid support of the socket or the margin of the latter and finds a bearing thereon, checking or limiting this tipping movement before the parts can separate. At the same time the stud may readily be withdrawn by a manipulation of the lower part of the curtain or supporting fabric as is desired.

I have described in detail the preferred embodiments of my invention shown by way of illustration in the accompanying drawings, but it will be understood that I have done this in order that the particular constructions shown and the manner in which they illustrate the theoretical principles involved might be more readily understood, and not because the exact details are essential to the invention.

What I claim as new and desire to secure by Letters Patent I shall express in the following claims:

1. A fastener for curtains and the like comprising, in combination, a resilient stud having a shank, means for securing said stud to the curtain, a rigid socket, means for securing said socket to a rigid support, said stud and socket separable by tipping of the stud in a predetermined direction only, and coöperating stop means between the shank of the stud and socket, said stop means opposing translation of forces arising from strain in a direction generally transverse to the longitudinal axis of the stud into a resultant force which, if unopposed, would tip the stud relative to the socket in that predetermined direction necessary to disengage said stud from said socket.

2. A stud and socket fastener comprising a stud member having a concave base provided with means for attaching the same to a supporting member with the bottom of the concave inset from the face of the member and a stud rising therefrom having a head offset in the direction of strain and an annular socket having a shoulder inward of the front thereof and a convex front.

3. A stud and socket fastener comprising a stud member having a concave base provided with means for attaching the same to a supporting member with the bottom of the concave inset from the face of the member and a stud rising therefrom having a head offset in the direction of strain and an annular socket having an inwardly tapering opening terminating in a shoulder and having a convex front to be received by said concave base.

4. A stud and socket fastener comprising a stud member having a concave base provided with means for attaching the same to a supporting member with the bottom of the concave inset from the face of the member and a stud rising therefrom having a head offset in the direction of strain and an annular socket having a shoulder to engage said head and means for securing it to a support constructed to present the margin of the base adjacent the support when the parts of the fastener are engaged and bearing thereon under strain.

5. A stud and socket fastener comprising a stud member having a concave base provided with means for attaching the same to a supporting member with the bottom of the concave inset from the face of the member and a stud rising therefrom having a head offset in the direction of strain and an annular socket having an inwardly tapering opening terminating in a shoulder to engage said head and means for securing it to a support constructed to present the margin of the base adjacent the support when the parts of the fastener are engaged and bearing thereon under strain.

6. A stud and socket fastener comprising a hollow sheet metal stud having its end offset in the direction of strain to provide a shouldered portion and split from said shoulder across the end and along the opposite side, and a coöperating rigid tubular socket having an internal shoulder to engage the shoulder on the stud.

7. A stud and socket fastener comprising a hollow sheet metal stud having its end offset in the direction of strain to provide a shouldered portion and split from said shoulder across the end and along the opposite side, a coöperating rigid tubular socket having an internal shoulder to engage the shoulder on the stud and stop means to limit rocking of the stud about the shoulder of the socket under strain.

8. A stud for fasteners having a concaved base, a correspondingly concaved washer coöperating with said base to grip a fabric between them and a stud rising from the base having an extension in the line of strain providing a head.

9. A sheet metal stud comprising a concaved base provided with means for attaching the same marginally to a fabric and a stud member proper integral with said base and comprising a substantially cylindrical shank terminating in an upward offset providing a shoulder at one side of the stud lying adjacent the plane of the margin of the base, said stud being split from said shoulder across the end and along the opposite side.

10. A fastener for curtains and the like comprising a resilient stud carried by the curtain, a rigid socket carried by a rigid support, said stud and socket separable by tipping of the stud in a predetermined direction only, a shoulder on said stud, a coöperating shoulder within said socket, and coöperating stop means between said stud and socket and located exteriorly of said coöperating shoulders, said stop means opposing translation of forces arising from strain in a direction generally transverse to the longitudinal axis of the stud and to a resultant force, which, if unopposed, would tip the stud relative to the socket in that predetermined direction necessary to disengage said stud from said socket.

In testimony whereof, I have signed my name to this specification.

FRED S. CARR.